United States Patent Office 3,751,570
Patented Aug. 7, 1973

3,751,570
POLYNICOTINIC ESTERS OF HESPERIDIN
Eugene L. Leroi, Bievres, France, assignor to Societe d'Etudes de Produits Chimiques, Issy-les-Moulineaux, France
No Drawing. Continuation-in-part of abandoned application Ser. No. 726,232, May 2, 1968. This application July 16, 1970, Ser. No. 55,620
Claims priority, application Great Britain, May 5, 1967, 21,078/67
Int. Cl. C07c 47/18; A61k 27/00
U.S. Cl. 424—180       2 Claims

ABSTRACT OF THE DISCLOSURE

The present invention relates to the octonicotinic ester of hesperidin, to compositions containing it and to its preparation by reacting hesperidin with a nicotinoyl halide. The compound reduces the cholesterol count in the blood.

---

This application is a continuation-in-part of application Ser. No. 726,232 filed May 2, 1968, and now abandoned.

DETAILED DESCRIPTION

The invention relates to octonicotinic ester of hesperidin.

The compound of the present invention is prepared by reacting hesperidin with nicotinoyl halide, for example, nicotinoyl chloride, preferably in the form of its acid salt such as the hydrochloride in the presence of an organic solvent such as pyridine or a mixture of pyridine and chloroform; a large excess of nicotinoyl chloride hydrochloride of the stoichiometric proportions is used for obtaining this fully nicotinated form.

The compound of the present invention is particularly useful in reducing cholesterol in the blood and provides the advantage of not causing appreciable peripheral vasodilation (flush effect). In certain patients reduction of lipids and triglycerids has been noted. The product of the invention provides the advantage of having a substantially low toxicity, even at high levels, as evidenced by the injection of amounts as high as 10 g./kg. in mice without any accompanying mortality.

Pharmaceutical preparations for administration of the polynicotinic ester of hesperidin of the present invention in unit form can take the form of compressed powders or a powder enclosed in a suitable capsule of absorbable material such as gelatin. The compressed powders or tablets can take the form of the active material admixed with suitable excipients and/or diluents such as starch, lactose, stearic acid, magnesium stearate, cocoa butter, methylcellulose, carboxymethylcellulose, tragacanth, pectin or dextrin.

The preparation of the product of the present invention will be more fully understood by referring to the following example.

Example: Hesperidin octonicotinate 213.8 g. (1.2 mole) of nicotinoyl chloride hydrochloride are dissolved in a mixture of 235 ml. of pyridine and 600 ml. of chloroform and boiled two hours at reflux. The mixture is then cooled and 0.1 mole (61 g.) of hesperidin dissolved in 500 ml. of pyridine is added, drop by drop, at a temperature of 10° C. with agitation.

The agitation is maintained for 6 hours, then the mixture is allowed to rest for three days. The pyridine and the chloroform are eliminated under reduced pressure, the residue is triturated with water, then the undissolved portion is washed with a 10% solution of sodium bicarbonate, then again with water until pH be about 7 and complete absence of Cl⁻ ions.

The dried product weighs 122 g.; the nitrogen determination by non-aqueous protometry and analysis show that it is hesperidin octonicotinate.

The nuclear magnetic resonance shows that all the OH groups have been esterified, confirming the data of the analysis.

The new polynicotinic ester of the invention may be used under various medical presentations. For instance, there has been prepared:

A compressed tablet form having the following composition:

|  | G. |
|---|---|
| Octonicotinate of hesperidin | 0.330 |
| Silicic acid | 0.010 |
| Corn starch | 0.035 |
| Alginic acid | 0.040 |
| Magnesium stearate | 0.040 |
| Total | 0.455 |

A gelatin capsule form containing per capsule:

|  | G. |
|---|---|
| Octonicotinate of hesperidin | 0.320 |
| Lactose | 0.015 |
| Magnesium stearate | 0.020 |
| Total | 0.355 |

The tablet form was applied to the patients listed below in the manner there set forth and with the results indicated; the arterial blood pressures are expressed in centimeters of mercury.

(1) A patient, 44: This patient suffers from an hypercholesterolemy, a xanthelasma and vaso-motor disorders, with algesias in lower members.

The patient was treated with the product of the present invention, 2 tablets per diem for over 3 months and a half.

The patient noted the progressive, then complete disappearing of his algesias in lower members.

The biological results show that the cholesterol content in the blood of this patient has decreased by 0.35 g.

(2) A patient, 68: This patient suffers from gout, visual disorders and hypertriglceridemy. His knees are painful and he exhibits important losses of memory. His arterial blood pressure is 15–9 and X-ray examination shows a cervical arthrosis.

The patient was treated with the product of the present invention, four tablets per diem during two months and a half.

The treatment improved remarkably and normal functions of this patient with disappearance of the memory disorders, increase of sight and lowering of arterial blood pressure to 13–8.

Besides, good tolerance and a real decrease of the figures corresponding to cholesterol, lipids and triglycids.

(3) A patient, 68: This patient suffers from spasms, and has an hypertriglyceridemy. Previously, he has suffered from arteriopathy of the lower members and arthrosis has been noted.

Now, his aretrial blood pressure is 16–9. The patient was treated with the product of the present invention, four tablets per diem over one month.

After this treatment, a decrease of all lipidic elements of the serum was observed.

(4) A patient, 63: This patient, who has been regularly attended for several years for secondary infarct and secondary angor, suffers also from hypercholesterolemic, tendinous xanthomatosis and complains of asthenia and precordial pains.

The patient was treated with the product of the present invention, four tablets per diem over four months, with an interruption of two months and again the product of the invention during three months.

The results of the treatment were marked from the first month.

In contrast when the patient was treated for 2 months with another cholesterolemiant the lipidic figures increased notably.

After the second treatment with the product of the present invention, the figures became normal and the cholesterol decreased by 0.45 g.

The patient exhibited good tolerance of the medicament.

(5) A patient, 58: This patient suffers from hypercholesterolemy and hypertriglyceridemy; important asthenia, loss of memory and rheumatismil crisis in left hemibody.

Previously, she suffered from a coronary deficiency.

The patient was treated with the product of the present invention, six tablets per diem over one month.

After the treatment, a new biological test showed that cholesterol had decreased by 0.20 g., lipids by 2 g., and triglycerids by 1.7 g.

The patient asks for continuance of her treatment. Excellent tolerance.

What is claimed is:
1. The octonicotinic ester of hesperidin.
2. A therapeutic composition of matter for the reduction of cholesterol values in the blood, comprising a pharmaceutical acceptable carrier and an effective amount of octonicotinate of hesperidin as an essential ingredient therein.

References Cited
UNITED STATES PATENTS

| | | | |
|---|---|---|---|
| 3,272,832 | 9/1966 | Nakano et al. | 260—211.5 R |
| 3,422,086 | 1/1969 | Carron et al. | 260—211.5 R |

OTHER REFERENCES

Koeppen "Chemical Abstracts," vol. 71, 1969, p. 452 (50420y).

LEWIS GOTTS, Primary Examiner

J. R. BROWN, Assistant Examiner

U.S. Cl. X.R.

260—210 F